No. 12,583.

REISSUED DEC. 18, 1906.

W. J. HILLIARD.

CLUTCH PULLEY.

APPLICATION FILED MAY 28, 1906.

2 SHEETS—SHEET 1.

WITNESSES:

J. H. O'Brien

L. V. Stoltzfus

INVENTOR

William J. Hilliard

BY

Eugene Owen

ATTORNEY

No. 12,583.

REISSUED DEC. 18, 1906.

W. J. HILLIARD.

CLUTCH PULLEY.

APPLICATION FILED MAY 28, 1906.

2 SHEETS—SHEET 2

WITNESSES:

J. H. O'Brien

L. U. Stoeltzlen

INVENTOR

William J. Hilliard

BY

Eugene Owen

ATTORNEY

UNITED STATES PATENT OFFICE.

WILLIAM J. HILLIARD, OF ELMIRA, NEW YORK, ASSIGNOR TO THE HILLIARD CLUTCH & MACHINERY COMPANY, OF ELMIRA, NEW YORK.

CLUTCH-PULLEY.

No. 12,583. Specification of Reissued Letters Patent. Reissued Dec. 18, 1906.

Original No. 753,073, dated February 23, 1904. Application for reissue filed May 28, 1906. Serial No. 319,212.

*To all whom it may concern:*

Be it known that I, WILLIAM J. HILLIARD, a citizen of the United States, and a resident of Elmira, in the county of Chemung and State of New York, have invented new and useful Improvements in Clutch-Pulleys, of which the following is a full, clear, and exact description.

My invention relates to improvements in clutch-pulleys adapted for use on shafts and machinery; and one object that I have in view is the provision of a simple and compact device which embodies in a single structure the parts necessary to drive or to be driven by a belt and to make the belt member fast or loose with a shaft.

A further object is to provide the pulley with means by which the loose member may be made fast automatically with the shaft on the rotation of the latter, thus making provision for taking up the load gradually and by the progressive action of the clutch, such form of the pulley being especially useful in connection with gas-engines and other forms of machines.

Further objects and advantages of the invention will appear in the course of the subjoined description, and the novelty will be defined by the annexed claims.

Reference is to be had to the accompanying drawings, forming a part of this specification, in which similar characters of reference indicate corresponding parts in all the figures.

Figure 1:
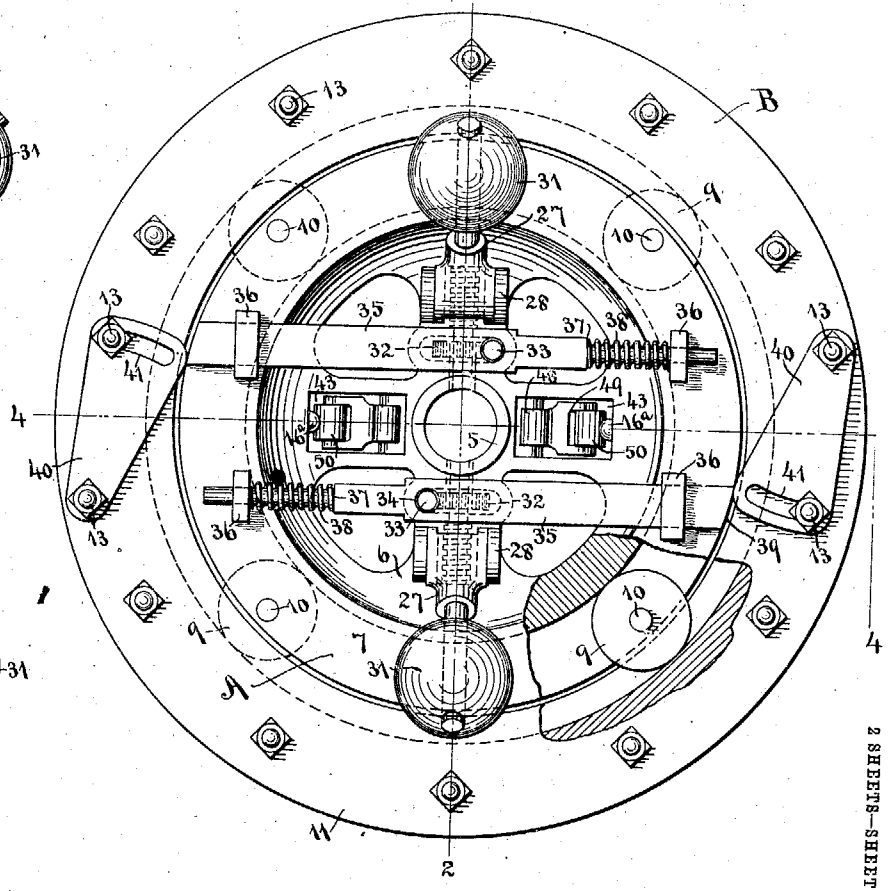
Figure 2:
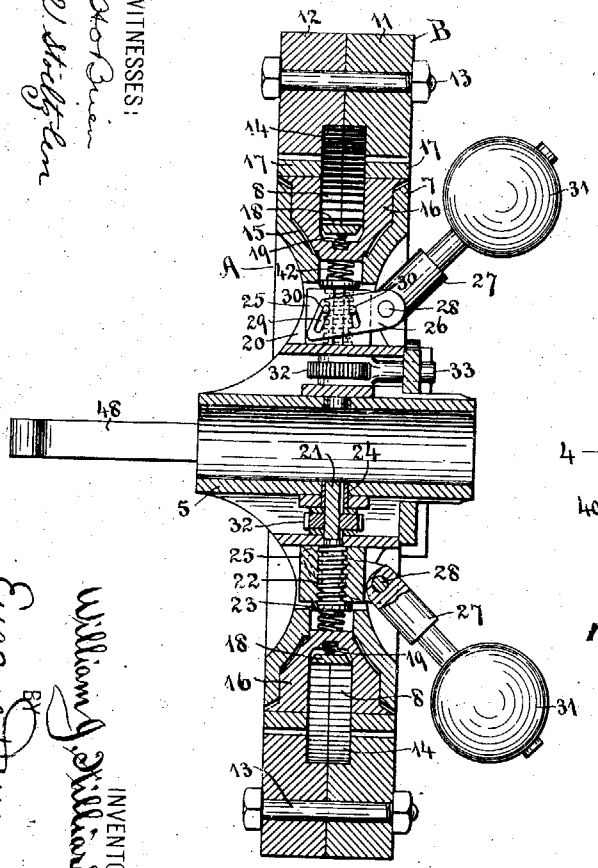
Figure 3:
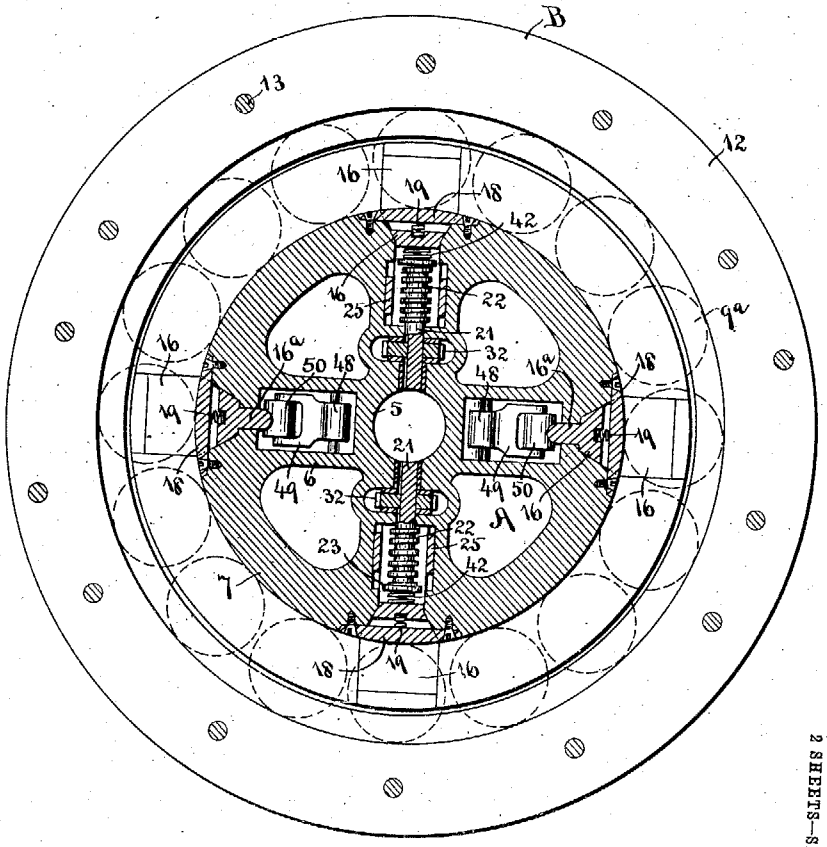
Figure 4:
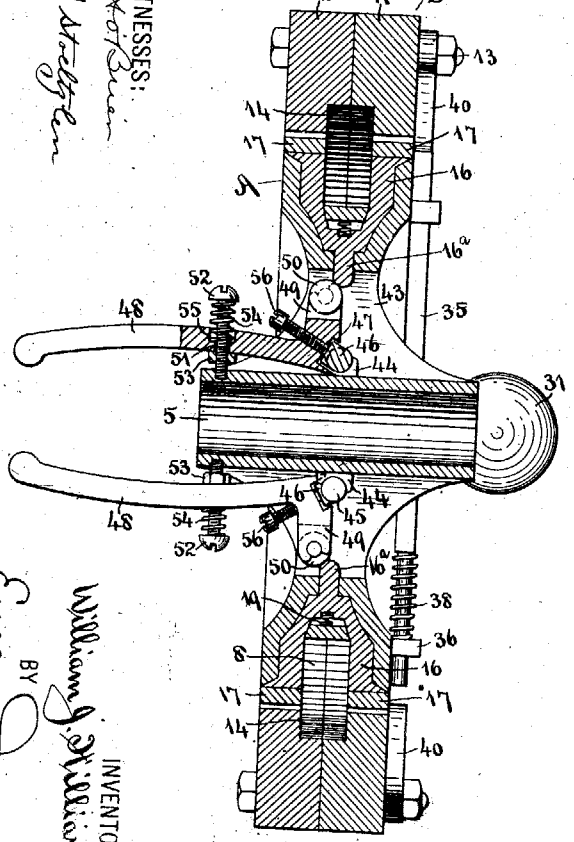

Figure 1 is a side elevation of a clutch-pulley constructed in accordance with my invention and showing the same equipped with means for automatically making the loose member fast with the shaft member. Fig. 2 is a vertical cross-section on the line 2 2 of Fig. 1. Fig. 3 is a vertical sectional elevation taken centrally through the construction shown by Fig. 4, and Fig. 4 is a horizontal section on the line 4 4 of Fig. 1.

A designates the fast or revoluble member, and B is the loose or idle member.

The fast member A is provided with an elongated hub or sleeve 5, adapted to be fastened in any suitable way to a shaft for the purpose of rotating therewith. This fast member has a web 6 extending outwardly from the hub and joined with a rim portion 7. The rim 7 is provided with an annular groove or channel 8, which accommodates a series of bearing-rollers 9, the latter having suitable stub-axles 10, which are mounted in any suitable way in said rim of the fast member A. As shown by Fig. 1, I employ a series of four rollers 9, which are spaced equidistant around the periphery of the member and lie partly within the annular channel 8 thereof, the rollers projecting beyond the periphery of said member A. It is evident, however, that the number of rollers employed in the series may be increased, although in Figs. 1 and 2 I have only shown the series of four rollers, the latter being sufficient to properly support the pulley member B when it runs idly on the member A.

The loose pulley member B is shown by Fig. 2 as consisting of complemental sections 11 12, which are assembled in matching relation and are secured firmly together by a plurality of through-bolts 13, the sectional construction of said pulley member facilitating its application to the rim and the rollers of the fast member A. The parts comprising the loose pulley member are provided at their inner edges and in their opposing faces with matching recesses adapted to form an annular track or way 14, in which is received the projecting portions of the rollers 9, constituting the series on the fast pulley member A. The inner edge of the sectional loose pulley member B is disposed quite close to the periphery of the rim 7, forming the part of the member A, and this member B is sustained loosely in place around the member A by the series of rollers 9, which fit in the annular track 14, provided in the inner edge of said member B, said rollers preventing lateral displacement of one member relatively to the other.

The member A is furthermore provided in its web and the rim with a series of radial openings 15, the same being equidistantly formed in the member and alternating with the rollers 9 of the series as the parts are arranged in Fig. 1. These radial openings accommodate the shoes 16, which are fitted snugly in the openings and are free to have a limited radial movement therein. Each shoe is forked, bifurcated, or split for a part of its length, as shown by Figs. 2 and 4, in order that the shoe may straddle or embrace the annular channel 8, which is provided in the rim, and these shoes are provided at their outer ends with friction-faces 17, which are disposed in opposing relation to the inner edges of the parts 11 12, comprising the idle member B. These friction-faces may consist of layers of compressed fiber or any other suitable material adapted to have the proper amount of frictional engagement with the idle member B, and said friction-faces are movable radially with the shoes relatively to said idle member.

Through the forked shoes extend the bridge-plates 18, which are fastened to the rim portion of the member A and afford the track-surfaces for the travel of the rollers 9 in case it is desired to allow these rollers to run idly in the coincident channels 8 14 of the members A B. These bridge-plates have arcuate outer edges disposed flush with the bottom of the channel 8 in the rim, as indicated more clearly by Fig. 3.

Between the fixed bridge-plates 18 and the radially-movable shoes 16 are disposed the coiled springs 19, which tend to normally impel the shoes inwardly with respect to the member A, and thus withdraw the friction-faces 17 from engagement with the member B.

I will now proceed to describe the means by which the shoes are automatically moved radially in outward directions. The web 6 of the member A is provided with transverse slots 20, and across these slots are disposed the radially-movable stems 21, each having a screw-thread formed thereon at 22 for a part of its length and terminating in a head 23 at its outer end. A portion of each stem 21 plays loosely in a guide sleeve or socket 24, provided in the hub portion 5 of the member A, each stem being free to rotate axially and to have a radial movement. In each slot 20 of the web is arranged a two-part or split nut 25, which when closed is adapted to have its threads engage with the male threads 22 of the stem. The members or parts of the divided nut are embraced by the bifurcated end 26 of a lever 27, the latter being fulcrumed on a suitable pin or bolt 28, supported on the member A. The arms 26, formed by the bifurcation of the lever, are provided with cam-slots 29, which are engaged by the pins or studs 30, attached to the members of the nut 25, and when the member A is in motion the centrifugal force developed by said member throws the lever 27 in outward direction, thus imposing the action of the levers on the studs and allowing the members of the nut to close, so as to have engagement with the threaded stems 21. Each lever 27 is provided with a weight 31, and in the drawings I have shown the fast member A as having two of these levers adapted to control a like number of nuts which actuate the stems 21, placed on diametrically opposite sides of the pulley. Each stem is furthermore provided with a ratchet 32, which is engaged by a lever 33, the latter fitting loosely on the stem to turn freely thereon and extending outwardly from the pulley member A, so as to fit in an opening 34, which is provided in a slidable bar 35. One of these slidable bars is used in connection with each stem, and each bar is loosely held for endwise movement in a pair of guide-lugs 36, provided on one face of the member A. Each bar 35 has a shoulder 37, against which acts one end of a coiled impelling-spring 38, the other end of which is seated against one lug 36. The free end of each slidable bar has a curved or beveled nose 39, and this bar is normally impelled by the spring 38 in one direction, so that its nose will ride against the projecting edge of a cam-plate 40, carried by the idle member B. This cam-plate is loosely fitted on one of the through-bolts 13, and it is provided with a curved slot 41, which loosely receives another of the bolts 13 of the series. The plate 40 is held adjustably in position by the bolts; but it should be adjustable for one edge or corner thereof to project beyond the inner edge of the member B, to which said plate is attached. Between the head 23 of each stem and the inner end of one of the shoes is interposed a coil-spring 42, which serves to return the stem to its normal position; but on the outward movement of the stem the spring is compressed and imparts a like movement to the shoe 16.

With the parts in their normal positions the stems 21 are pressed toward the hub of the member A by the springs 42, and the weighted levers 27 are thrown inwardly in order to release the members of the nuts from engagement with the threaded portions of the stems. The member A rotates with the shaft of an engine or other part of machinery, while the member B remains at rest owing to its engagement with the belt which is to be driven. On the rotation of the member A the levers 27 move outwardly by the centrifugal energy developed by said member, and these levers turn on their fulcra 28 to make the cam-slots 29 act on the pins 30, thus securing the desired closing of the nuts 25. The bars 35 rotate with the member A, and as they pass the cam-plates 40 these bars are moved inwardly against the energy of the springs 38. By pressing the bars 35 backwardly the levers 33 are moved in order to turn the ratchets 32 and impart like movement to the stems 21. The continued rotation of the pulley member A imparts a progressive step-by-step movement to the stems 21, which work in the closed nuts 25, thus gradually moving the stems 21 in radial directions against the shoes 16. The shoes are thus forced outward to press the friction-faces 17 against the member B, and the continued radial movement of the stems under the action of the feed mechanism heretofore described operates to clutch the member B tightly to the member A, whereby the load is gradually taken up and the member B is caused to rotate with the member A.

When the members A and B are rotating together at the same speed; the cams 40 will of course cease to act on the bars 35, since all parts are then rotating in unison. Should slippage occur between the members A and B, the cams will again be brought into action, by reason of the relative motion of said members, to set the shoes up tighter.

The pulley is also shown equipped with means for moving a second set of clutch-shoes radially, such means being adapted for operation by hand. The shoes 16 are therefore four in number, and two of these shoes are provided with inwardly-extending stems 16ª. (See Figs. 3 and 4.) These stems project into radial slots 43, which are provided in the web of the member A, and in the slots are formed or secured the bearing-lugs 44. The lugs are disposed in pairs to receive pintles 45 and an adjustable thrust-block 46, the latter fitting in recesses 47, which are provided at the knees of angular levers 48, each lever having an offstanding arm 49, which carries an antifriction-roller 50. The levers are disposed on opposite sides of the hub and extend outwardly from the pulley. (See Fig. 4.) Each lever is provided with a slot or opening 51 at a point intermediate of its length, and through this slot passes a fulcrum-bolt 52, which is screwed into the hub, said bolt having a nut 53 and supporting the coiled spring 54, which fits in a socket 55, provided in the lever. The lever is held loosely on the fixed bolt and pressed against the nut 53 by the action of the spring 52. Said lever is also provided with a take-up screw 56, which finds a threaded bearing in the inner portion of the lever and which acts against the pivoted block 46 in a way to take up the lost motion due to wear of the parts.

Any suitable means may be provided for simultaneously moving the pair of levers 48 in one direction and making the rollers 50 ride against the stems 16ª of the shoes, thus moving the latter outwardly against the energy of the springs 19 and making the friction-faces 17 of the shoes engage with the member B. By reference to Fig. 4 it will be seen that in the normal positions of the levers 48 the rollers 50 lie to one side of the stems 16ª on the shoes; but when the outer ends of the levers 48 are pressed apart these inner arms 49 are moved, so as to make the rollers 50 lie against the stems 16ª and force the shoes radially in outward directions, thus making the friction-faces 17 press forcibly against the inner edge of the member B. The desired movement of the levers 48 may be effected by the employment of a slidable member on a shaft, such as a cone adapted to ride against the levers 48 and to be changed in position by the operation of a suitable shifting-lever.

The clutch with the hand-operated shoes is adapted for use on a line-shaft or the shaft of an engine, whereas a clutch equipped only with the automatic set-up may be advantageously employed on the driving-shaft of a gas-engine or other motor. In fact, the automatic clutch may be employed wherever it is desired to have the load gradually taken up by the application of clutch mechanism.

It will also be understood that the levers 27 may be operated by hand instead of by centrifugal force to close the nuts and place the automatic set-up in operation.

Where the pulley is to be used as a tight and loose pulley alternatively, I may employ a continuous series of rollers 9ª between the fast and loose members, as indicated in Fig. 3, thus equalizing the bearing and minimizing the friction of the member D on the member A.

My improved construction obviates the necessity of oiling the bearings of pulleys and wholly overcomes the cutting or wearing out of the hub where it engages with the shaft, because there is no friction between the shaft and the pulley, and the parts cannot become clogged or worn. The clutch mechanism cannot slip in the rotary motion of the pulley, because any slipping will insure the rotation of the screw, which thereby tightens the parts and increases the frictional engagement of the shoes with the loose member.

The clutch mechanism as herein described may be modified within wide limits and may be applied to different forms of clutches used for coupling and uncoupling running parts.

Having thus described my invention, I claim as new and desire to secure by Letters Patent—

1. A clutch comprising driving and drive members, movable shoes carried by one member to engage the other, means also carried by the one member for actuating the shoes, means actuated by the rotation of said member to automatically place said shoe-actuating means in operative condition, and coöperating devices upon the two members whereby the rotation of one relatively to the other will automatically impart motion to the shoe-actuating means.

2. A clutch comprising driving and driven members, movable shoes carried by one member to engage the other, a screw mechanism for actuating the shoes, coöperating devices upon the two members whereby the rotation of one relative to the other will automatically impart motion to the screw mechanism, means for throwing said screw mechanism into and out of operative condition, and means for releasing the shoes when the screw mechanism is thrown out.

3. A clutch comprising driving and driven members, a shoe carried by one member to engage the other, an adjusting-screw adapted to actuate the shoe, a divided nut, means for moving the parts of said nut into and out of engagement with the screw, and coöperating devices upon the two members whereby the rotation of one relatively to the other will automatically rotate the screw.

4. A clutch comprising driving and driven members, a shoe carried by one member to engage the other, a threaded stem adapted to actuate the shoe, a divided nut, means operable by the rotation of one of said members for moving the parts of said nut into engagement with the stem, and coöperating devices upon the two members whereby the rotation of the one relatively to the other will impart rotation to the stem in the nut.

5. A clutch comprising driving and driven members, a shoe carried by one member to engage the other, a threaded longitudinally-movable stem to actuate said shoe, a fixed nut in which the stem operates, a ratchet on the stem, a slide on one member in operative connection with the ratchet, and a cam on the other member whereby a reciprocating motion is imparted to said slide when one member rotates relatively to the other.

6. A clutch comprising driving and driven members, a shoe carried by one member to engage the other, a threaded longitudinally-movable stem to actuate said shoe, a fixed nut in which the stem operates, and means for imparting a step-by-step rotation to the stem when one member rotates relatively to the other.

7. A clutch comprising driving and driven members, a shoe carried by the driving member to engage the driven member, a threaded stem to actuate said shoe, a divided nut adapted to engage the stem, a centrifugally-operated lever connected with the parts of said nut to automatically close the same upon the stem when the driving member is rotated, and means for imparting rotation to the stem when one member rotates relatively to the other.

8. A clutch comprising driving and driven members, a shoe carried by one member to engage the other, a threaded stem to actuate said shoe, a divided nut adapted to engage the stem, a lever having arms provided with cam-slots, and projections on the nut parts engaging said slots.

9. A clutch comprising driving and driven members, a shoe carried by one member to engage the other, a threaded stem to actuate said shoe, a nut in which the stem operates, a ratchet-lever, a bar slidably mounted on the shoe-carrying member in engagement with said lever, a spring for impelling said bar in one direction, and a cam on the other member whereby said bar is impelled in the opposite direction when the one member rotates relatively to the other.

10. A clutch comprising driving and driven members, a shoe carried by one member to engage the other, mechanism mounted on the shoe-carrying member to actuate said shoe, and an adjustable cam on the other member adapted to set said mechanism in motion when one member rotates relatively to the other.

11. A clutch-pulley comprising driving and driven members, coincident channels in the opposing surfaces of said members, a series of rollers in said channels, a forked shoe slidably mounted on one member to straddle the roller-channel and having faces adapted to engage the other member, and means for adjusting said shoe.

12. A clutch-pulley comprising fast and loose members provided in their opposing faces with coincident channels, bearing-rollers in said channels to support the loose member on the fast member and maintain it against lateral displacement thereon, forked shoes mounted for radial movement on the fast member and straddling the roller-channel therein, said shoes having divided friction-faces presented to the loose member, and means for adjusting said shoes.

13. A clutch-pulley comprising fast and loose members, roller-bearings between said members, forked shoes on the fast member arranged to straddle the bearings and having radial stems associated therewith, and means engaging said stems for moving the shoes radially.

14. A clutch-pulley comprising a shaft member, a loose member, forked shoes movable radially in the shaft member, bridge-plates carried by the shaft member and extending through said shoes, bearing-rollers fitted to the members and adapted to ride on the bridge-plates, and means for moving said shoes into engagement with the loose member.

15. A clutch-pulley comprising a shaft member provided with a peripheral channel, a loose member consisting of complemental sections united laterally to complete said member and produce an internal channel to coincide with the channel on the shaft member, bearing-rollers fitted in said channels, forked shoes mounted in the shaft member, bridge-plates spanning the shoes and affording track-surfaces for the rollers, and means for adjusting the shoes.

In testimony whereof I have signed my name to this specification in the presence of two subscribing witnesses.

WM. J. HILLIARD.

Witnesses:

JAMES H. O'BRIEN,
LEO V. STOELTZLEN.